(12) United States Patent
Landers, Jr. et al.

(10) Patent No.: US 7,840,846 B2
(45) Date of Patent: Nov. 23, 2010

(54) POINT OF SALE SYSTEM BOOT FAILURE DETECTION

(75) Inventors: John David Landers, Jr., Raleigh, NC (US); David John Steiner, Raleigh, NC (US); Paul Morton Wilson, Cary, NC (US); Kimberly Ann Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 11/554,291

(22) Filed: Oct. 30, 2006

(65) Prior Publication Data

US 2008/0155332 A1    Jun. 26, 2008

(51) Int. Cl.
*G06F 11/00* (2006.01)
(52) U.S. Cl. ....................................................... 714/36
(58) Field of Classification Search ................... 714/36
See application file for complete search history.

(56) References Cited

U.S. PATENT DOCUMENTS

| | | | |
|---|---|---|---|
| 6,101,617 A * | 8/2000 | Burckhartt et al. ............ 714/23 |
| 6,421,792 B1 * | 7/2002 | Cromer et al. ................ 714/36 |
| 6,587,960 B1 | 6/2003 | Barford et al. | |
| 6,922,722 B1 * | 7/2005 | Mann et al. ................ 709/220 |
| 6,996,706 B1 | 2/2006 | Madden et al. | |
| 7,409,435 B1 * | 8/2008 | Bayerl et al. ................ 709/217 |
| 2002/0091966 A1 * | 7/2002 | Barton et al. .................. 714/25 |
| 2002/0150086 A1 * | 10/2002 | Bailey et al. ................ 370/352 |
| 2003/0046529 A1 * | 3/2003 | Loison et al. .................. 713/2 |
| 2003/0185151 A1 * | 10/2003 | Kurosawa et al. ........... 370/219 |
| 2004/0133474 A1 * | 7/2004 | Tami et al. .................... 705/16 |
| 2006/0112297 A1 * | 5/2006 | Davidson ........................ 714/2 |
| 2006/0259539 A1 * | 11/2006 | Martikian ................... 709/202 |

OTHER PUBLICATIONS

Alexander et al., "DHCP Options and BOOTP Vendor Extensions", RFC 2132, Mar. 1997, pp. 1-32 http://ietf.org/rfc/rfc2132.txt.
Droms, "Dynamic Host Configuration Protocol", RFC 2131, Mar. 1997, pp. 1-43. http://ietf.org/rfc/rfc2131.txt.

\* cited by examiner

*Primary Examiner*—Scott T Baderman
*Assistant Examiner*—Yair Leibovich
(74) *Attorney, Agent, or Firm*—Yee & Associates, P.C.; Jason O. Piche

(57) ABSTRACT

A computer implemented method and computer program product for detecting and communicating boot failures in a client device. A Dynamic Host Control Protocol server is configured to monitor Dynamic Host Control Protocol communications from one or more client devices, wherein the client devices are configured to boot from local media. A boot request is received from a client device in response to a failure of the client device to boot from the local media. Responsive to receiving the boot request, a determination is made that a boot failure has occurred on the client device.

7 Claims, 3 Drawing Sheets

POINT OF SALE SYSTEM BOOT FAILURE DETECTION

BACKGROUND OF THE INVENTION

1. Field of the Invention

The present invention relates generally to an improved data processing system, and in particular to a computer implemented method and computer program product for detecting and communicating boot failures in a client device.

2. Description of the Related Art

In a client-server environment, a client device which comprises a Point of Sale (POS) system is typically connected to a server using a closed Ethernet network. A point of sale system may be used in a wide variety of retail businesses such as a supermarket, a convenience store, or the like, for performing such processes as calculating the total price of a purchase (goods or services) and calculating the amount of change due to a customer. Some point of sale terminals furthermore track purchases made and adjust a database of store inventory accordingly.

Point of sale systems are increasingly including system management capabilities and diagnostic tools. This increase is driven by the fact that local resources have limited technical skill and point of sale systems are often installed geographically dispersed (and some by necessity) from the technical skill of a central Information Technology (IT) staff. In order to reduce the total cost of ownership, the system management and diagnostic tools in the point of sale systems are designed to allow the systems to provide detailed fault information to the central IT site, such that faults which occur at the point of sale systems and require the physical presence of service personnel may be corrected quickly, efficiently, and in one trip.

However, there are many fault conditions which can prevent a computing device such as a point of sale system from booting the operating system, thereby preventing the systems management drivers/diagnostic tools from communicating any information about the detected failure. The examples include a failed hard disk drive (HDD), a corrupt file on the hard disk drive, an incomplete Preboot Execution Environment (PXE) load, or bad memory (i.e., fault in high memory which allows Power-On-Self-Test (POST) or the computer's pre-boot sequence to run).

BRIEF SUMMARY OF THE INVENTION

The illustrative embodiments provide a computer implemented method and computer program product for detecting and communicating boot failures in a client device. A Dynamic Host Control Protocol server is configured to monitor Dynamic Host Control Protocol communications from one or more client devices, wherein the client devices are configured to boot from local media. A boot request is received from a client device in response to a failure of the client device to boot from the local media. Responsive to receiving the boot request, a determination is made that a boot failure has occurred on the client device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
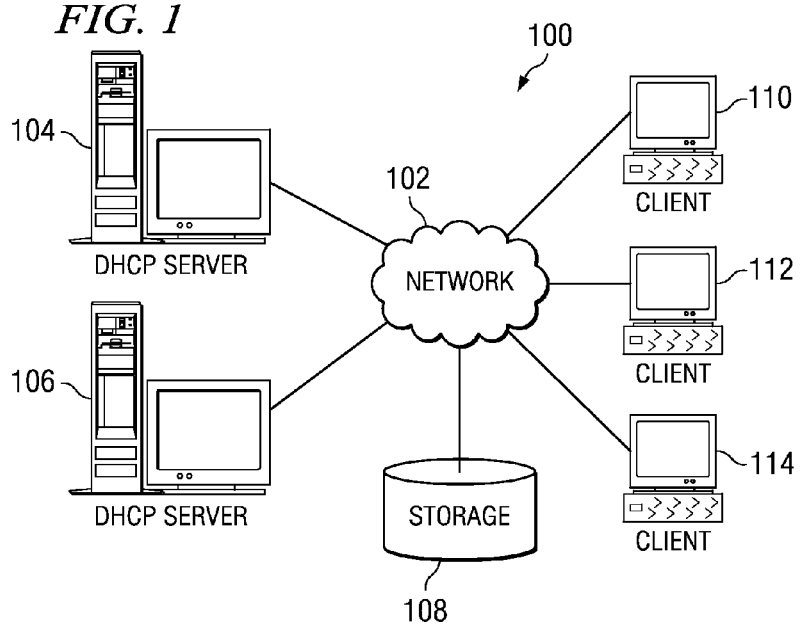
FIG. 1 depicts a pictorial representation of a distributed data processing system in which the illustrative embodiments may be implemented.
Figure 2:
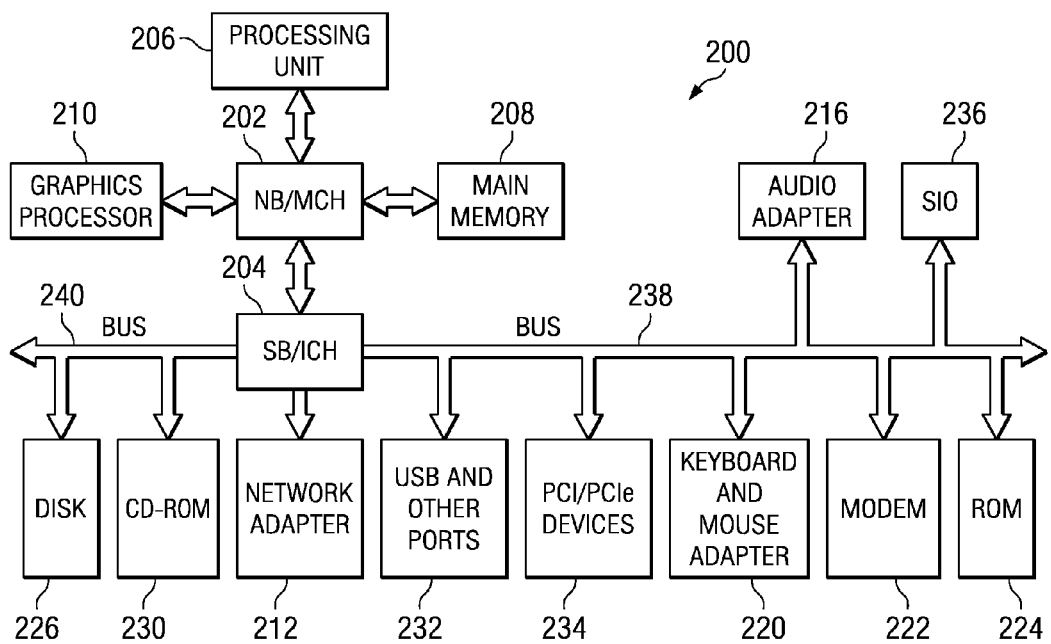
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 is a Dynamic Host Control Protocol (DHCP) server, which provides addresses, such as IP addresses to clients requesting addresses when logging onto network 102.

In this illustration, server 106 and clients 108-112 are clients to server 104 with respect to requesting addresses. Server 106 obtains a static address from server 104, while clients 108-112 obtain dynamic addresses from server 104. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method and computer program product for detecting and communicating boot failures in a client device. The illustrative embodiments are directed to systems management wherein a number of personal computers (PCs) or point of sale (POS) systems gather data about themselves and communicate this information back to a central server. In a typical server environment, a system processor has a dedicated secondary communication path which is used to detect and report faults. However, POS systems and some PCs are linked via a single Ethernet communication connection to upstream devices, servers, etc. and have no other communication path in which to report faults if the system is unable to boot its main operating system (e.g., due to a corrupt or failed hard disk).

The illustrative embodiments enable the PC or POS to communicate boot failures to the central server within the context of DHCP and PXE protocols, thereby allowing action to be taken to fix the failure. An action may include calling IT staff or a service provider to perform a repair action, or instructing someone on site how to fix the system. When a fault is detected in the PC or POS system, the system BIOS will switch to load via the network if it is not already booting from the network. The system will then make a DHCP and subsequent PXE request. The DHCP server is configured to monitor this activity and may determine the identity of the failing system, which may be reported to local and/or remote/central IT personnel. The illustrative embodiments allow the receipt of the boot request to provide notification to the DHCP server that there is a system boot failure on the requesting PC or POS system.

Figure 3:
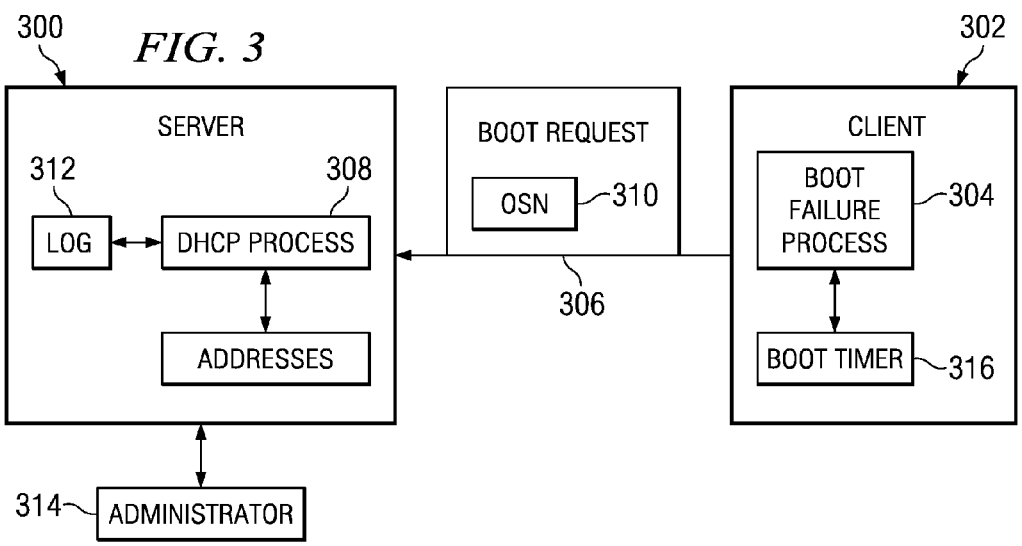
FIG. 3 is a block diagram of components used to detect and communicate fault conditions in accordance with the illustrative embodiments.

Turning next to FIG. 3, a diagram illustrating components used in detecting and monitoring boot failures is depicted. In this illustrative example, server 300 is a DHCP server, such as server 104 in FIG. 1. Client 302 is a client, such as client 108. In one embodiment, client 302 is a point of sale terminal, which communicates with server 300 in a closed network.

DHCP server 300 traditionally provides the ability for a network administrator to centralize the configuration of Internet Protocol (IP) addresses and operating parameters for all capable network-attached devices, as well as provide boot files and operating system images to DHCP client 302. Through this protocol and the structure of a DHCP message, DHCP client 302 is able to receive an IP address to be assigned to the interface through which the client was communicating with the DHCP server. Under the protocol, with the exception of the assignment of the IP address, all information that is exchanged between a client and a server is performed through what is known as "options". These options are small sections of data in the DHCP message used to specify the type of option and its data.

In the illustrative embodiments, DHCP server 300 is also configured to monitor boot requests from client devices in the network. Client 302 includes boot failure process 304, which is a process which enables the client to send boot request 306 to server 300 when the client experiences a hard disk drive failure in the boot process. Boot failure process 304 alters the boot sequence, which may at some point in the boot process specify that client 302 boot from the network. In this situation, client broadcasts boot request 306 to all DHCP servers in the network upon the occurrence of a boot failure. As DHCP server 302 is configured to monitor boot requests from the client devices, receipt of the boot request 306 at DHCP server 302 informs the server that a failure has occurred at a client in the network.

When boot request 306 is received at server 300, DHCP process 308 processes this request to determine the identity of the client which sent the boot request. This processing may include checking the Media Access Control (MAC) address in boot request 306 to determine the identity of the requesting client. In one embodiment, client device 302 may be configured to send any network boot requests to a particular "failure" DHCP server using an optional server name field in the DHCP message. In this situation, DHCP server 300 may be further configured to first scan optional server name (OSN) field 310 in boot request 306 to determine if the request is actually intended for DHCP server 300, since client 302 broadcasts boot request 306 to all DHCP servers in the network. If optional server name field 310 in boot request 306 includes the name of DHCP server 300 (i.e., DHCP server 300 is the failure server), then DHCP server 300 processes the request by recording the MAC address in log 312 and notifying administrator 314 that a fault has occurred on client 302. Otherwise, if DHCP server 300 is not the designated failure server, the boot request 306 is ignored.

In another embodiment, boot timer 316 is used to trigger a forcible reboot of client device 302 when a partial boot of the operating system occurs (i.e., client device 302 boots off of the hard drive and while the OS is loading, the boot fails and the client is hung and unusable). Boot timer 316 is set when client device 302 starts booting. Boot timer 316 is set so that if the timer is not cleared within a set time period of the timer, the timer will forcibly reboot the machine when the time is up, and the boot sequence will be changed to report the fact that the machine did not boot properly.

Figure 4:
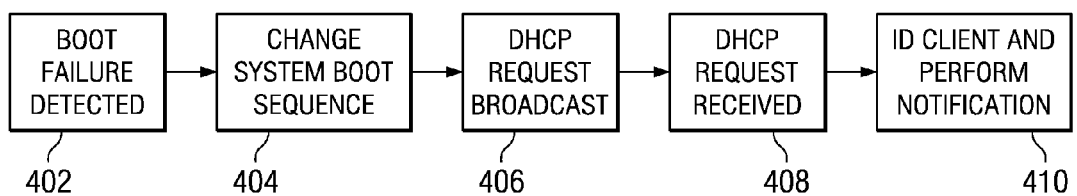
FIG. 4 is a flowchart of a process for communicating a boot failure in a client device in accordance with the illustrative embodiments.

FIG. 4 is a flowchart of a process for communicating a boot failure in a client device in accordance with the illustrative embodiments. The process described in FIG. 4 may be implemented in a client device such as client 302 in FIG. 3. In particular, this embodiment is implemented in a closed Ethernet network comprising only connections between client devices (e.g., point of sale terminals) and DHCP servers. This embodiment also comprises client devices which boot from local media.

The process begins when a boot failure occurs at the client device (step 402). When such a boot failure is detected, the client device changes the system boot sequence (step 404). If the boot sequence instructs the system to boot from the network, the client device broadcasts a boot request to all DHCP servers in the network (step 406). This boot request may comprise a typical DHCP message including the MAC address of the requesting client. In this case, the boot request is provided to all DHCP servers in the network, and these DHCP servers are configured to monitor the network for such requests.

When a DHCP server in the closed network receives the boot request (step 408), the mere receipt of the boot request informs the DHCP server that there is a boot failure at a client device in the network, since all of the client devices are supposed to boot from local media, rather than from the network. In other words, while a DHCP machine in its typical operations may receive requests for IP addresses from other normally functioning client devices (DHCP servers currently serve IP addresses and ignore boot requests), normally functioning client devices do not send boot requests to the server. Thus, the DHCP server may determine there is a problem when it receives a request within the protocol to boot off of the network. The DHCP server may also determine on which particular client device the boot failure has occurred from the MAC address in the boot request. The DHCP server may then record the MAC address of the requesting client in a log and notify an administrator of the boot failure (step 410), so that action may be taken to correct the error.

Figure 5:
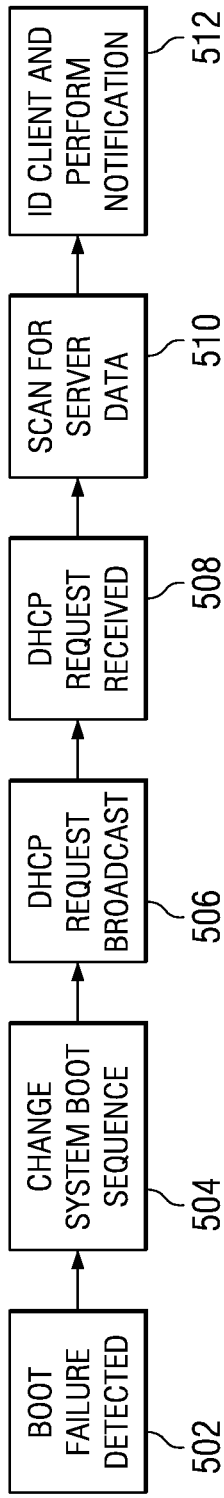
FIG. 5 is a flowchart of a process for communicating a boot failure from a client device to a particular server in accordance with the illustrative embodiments.

FIG. 5 is a flowchart of a process for communicating a boot failure from a client device to a particular server in accordance with the illustrative embodiments. In this particular embodiment, the client device is configured to specify a particular server name (i.e., the designated failure server) in the optional server name field of the DHCP message which is sent to the DHCP servers in the network when a boot failure occurs. In this manner, boot requests sent to a designated failure DHCP server informs the DHCP server that a boot error has occurred on a client device and that an appropriate action should be taken to fix the error. The embodiment in FIG. 5 may also be implemented in a PC environment which includes client devices which boot from the network.

The process begins when a boot failure occurs at the client device (step 502). The client device changes the system boot sequence (step 504). If the boot sequence instructs the system to boot from the network, the client device broadcasts a boot request to all DHCP servers in the network (step 506).

When a DHCP server in the network receives the boot request (step 508), the DHCP server then scans the boot request for server data (step 510). This server data may include information in the optional server name field in the DHCP message. If the boot request is directed to the DHCP server (i.e., the optional server name field contains the name of that DHCP server), that DHCP server may record the MAC address of the requesting client in a log and notify an administrator of the boot error (step 512), so that action may be taken to correct the error. If the boot request does not contain the name of the DHCP server, then the server ignores the boot request.

Figure 6:
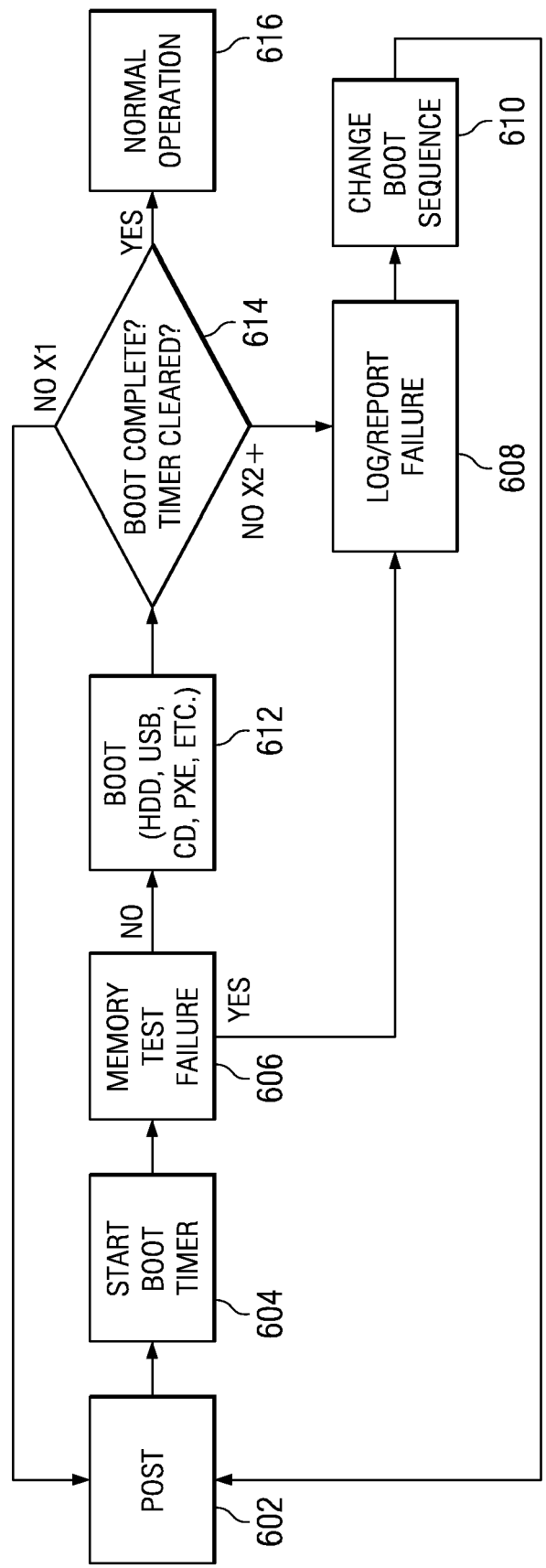
FIG. 6 is a flowchart of a process at a client device for monitoring a boot process for success or failure in accordance with the illustrative embodiments.

FIG. 6 is a flowchart of a process at a client device for monitoring a boot process for success or failure in accordance with the illustrative embodiments. This embodiment may be implemented when the operating system fails to load during the boot, and the client device is hung and thus unusable.

The process begins with the client device performing a Power-On-Self-Test (POST) (step 602). The POST is a diagnostic program which checks the system hardware to ensure that the system is functioning properly before the BIOS begins the actual boot. When the POST is initiated, the client device starts a boot timer (step 604). The boot timer comprises a set period of time in which the operating system is allowed to load. If the operating system loads properly, the boot timer is cleared and the client device may continue operating normally. In contrast, if the operating system gets hung and thus the boot timer is not cleared within the set time period, the boot timer will trigger a forcible reboot of the client device.

After the boot timer is set, a determination is made as to whether the POST has detected any fatal errors, such as a memory test failure (step 606). If a fatal error is detected ('yes' output of step 606), the boot process stops and the failure is reported and/or logged locally (step 608). Reporting and logging the failure is required to be performed to make the determination to change the boot sequence and make (report) the DHCP request or add information to the DHCP request in the optional server name field. The central server may also report and log the failure. The client device then changes its boot sequence to boot from the next device in the sequence (step 610), and the process loops back to step 602 to perform another POST.

Turning back to step 606, if no memory test failure is detected ('no' output of step 606), the client device continues the boot process, which may include initializing the hard disk drive, the universal serial bus flash drive, the CD-ROM, or the PXE load (step 612). A determination is then made as to whether the boot is complete and the boot timer has been cleared (step 614). If the boot is complete and the timer has been cleared ('yes' output of step 614), the client device continues its operations as normal (step 616).

Turning back to step 614, if the boot is not complete and the boot timer has expired ('no' output of step 614), the process loops directly back to step 602 to perform the POST if this is the first iteration of the process. Alternatively, if the boot is not complete and the timer has expired ('no' output of step 614) and the process has already POSTed from a previous incomplete boot, the process loops back to step 608, in which the incomplete boot is recorded and/or logged. The process continues to step 610 where the boot sequence is changed, and then loops back to step 602 to perform another POST.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for detecting and communicating boot failures, the computer implemented method comprising:
    configuring a Dynamic Host Control Protocol server to monitor Dynamic Host Control Protocol communications from one or more point of sale devices in a closed network, wherein the closed network comprises connections among a plurality of point of sale devices and one or more Dynamic Host Control Protocol servers;
    responsive to a failure of a point of sale device to boot from local media, receiving a boot request from the point of sale device, wherein receiving the boot request informs the Dynamic Host Control Protocol server that a boot failure has occurred on the point of sale device;
    responsive to receiving the boot request, checking an optional server name field in the boot request;
    if the name of the Dynamic Host Control Protocol server is present in the optional server name field, determining an identity of the point of sale device from the boot request and providing a notification, by the Dynamic Host Control Protocol server, of the boot failure to an administrator, wherein the notification comprises the identity of the point of sale device to allow a repair action to be taken on the point of sale device to correct the failure; and
    if the name of the Dynamic Host Control Protocol server is not present in the optional server name field, ignoring the boot request.

2. The computer implemented method of claim 1, wherein the point of sale device, upon the failure of the point of sale device to boot from the local media, changes a boot sequence of the point of sale device to load from the closed network and broadcasts the boot request to all Dynamic Host Control Protocol servers in the closed network.

3. The computer implemented method of claim 1, wherein the identity of the point of sale device is determined from the media access control address in the boot request.

4. The computer implemented method of claim 1, further comprising:
    setting a boot timer in the point of sale device comprising a set period of time in which a main operating system of the point of sale device is allowed to load;

determining whether the boot process has completed prior to expiration of the set period of time;

if the boot process has completed prior to the expiration of the set period of time, clearing the boot timer; and if the boot process has not completed prior to the expiration of the set period of time, rebooting the point of sale device.

5. A computer program product for detecting and communicating boot failures in a closed network, the computer program product comprising:

a computer storage medium having computer usable program code stored thereon, the computer usable program code comprising:

computer usable program code for configuring a Dynamic Host Control Protocol server to monitor Dynamic Host Control Protocol communications from one or more point of sale devices in the closed network, wherein the closed network comprises connections among a plurality of point of sale devices and one or more Dynamic Host Control Protocol servers, and wherein the point of sale devices are configured to boot from local media;

computer usable program code for receiving a boot request from a point of sale device in response to a failure of the point of sale device to boot from the local media, wherein receiving the boot request informs the Dynamic Host Control Protocol server that a boot failure has occurred on the point of sale device;

computer usable program code for checking an optional server name field in the boot request in response to the Dynamic Host Control Protocol server receiving the boot request;

computer usable program code for determining an identity of the point of sale device from the boot request and providing a notification, by the Dynamic Host Control Protocol server, of the boot failure to an administrator if the name of the Dynamic Host Control Protocol server is present in the optional server name field, wherein the notification comprises the identity of the point of sale device to allow a repair action to be taken on the point of sale device to correct the boot failure; and computer usable program code for ignoring the boot request if the name of the Dynamic Host Control Protocol server is not present in the optional server name field.

6. The computer program product of claim 5, wherein the point of sale device, upon the failure of the point of sale device to boot from the local media, changes a boot sequence of the point of sale device to load from the closed network and broadcasts the boot request to all Dynamic Host Control Protocol servers in the closed network.

7. The computer program product of claim 5, wherein the identity of the point of sale is determined from the media access control address in the boot request.

* * * * *